United States Patent
Kenowski (10) Patent No.: US 10,710,813 B2
(45) Date of Patent: Jul. 14, 2020

(54) SYSTEM AND METHOD OF CLEANING A CONVEYOR BELT

(71) Applicant: Andy Kenowski, Waukesha, WI (US)

(72) Inventor: Andy Kenowski, Waukesha, WI (US)

(73) Assignee: HYDRITE CHEMICAL CO., Brookfield, WI (US)

( * ) Notice: Subject to any disclaimer, the term of this patent is extended or adjusted under 35 U.S.C. 154(b) by 90 days.

(21) Appl. No.: 15/388,264

(22) Filed: Dec. 22, 2016

(65) Prior Publication Data
US 2018/0178987 A1  Jun. 28, 2018

(51) Int. Cl.
| | | |
|---|---|---|
| *B08B 1/02* | (2006.01) | |
| *B08B 1/04* | (2006.01) | |
| *B08B 3/02* | (2006.01) | |
| *B08B 11/00* | (2006.01) | |
| *B65G 45/22* | (2006.01) | |
| *D06G 1/00* | (2006.01) | |
| *B08B 11/02* | (2006.01) | |

(52) U.S. Cl.
CPC .............. *B65G 45/22* (2013.01); *B08B 1/02* (2013.01); *B08B 1/04* (2013.01); *B08B 3/022* (2013.01); *B08B 3/024* (2013.01); *B08B 11/00* (2013.01); *B08B 11/02* (2013.01); *D06G 1/00* (2013.01)

(58) Field of Classification Search
CPC .. B08B 1/02; B08B 1/04; B08B 3/022; B08B 3/024; B08B 11/00; B65G 45/22; D06G 1/00
USPC ........ 15/102, 256.5; 134/15, 32, 56 R, 64 R, 134/122 R, 199
See application file for complete search history.

(56) References Cited

U.S. PATENT DOCUMENTS

| | | |
|---|---|---|
| 5,356,480 A | 10/1994 | Melgeorge |
| 5,873,946 A | 2/1999 | Hantmann |
| 8,277,566 B2 | 10/2012 | Rubenzer et al. |
| 8,585,826 B2 | 11/2013 | Schreiber et al. |
| 2005/0087214 A1* | 4/2005 | Ransley, Jr. ............ B08B 3/041 134/25.1 |
| 2005/0257811 A1* | 11/2005 | Axtell ...................... B05C 5/02 134/34 |
| 2011/0220147 A1* | 9/2011 | Schreiber .................. B08B 1/02 134/15 |

OTHER PUBLICATIONS

Intralox Conveyor Belting Engineering Manual, Laitram, LLC Copyright 2016 Intralox, LLC, 446 pages.

* cited by examiner

*Primary Examiner* — Levon J Shahinian
(74) *Attorney, Agent, or Firm* — Quarles & Brady LLP (57) ABSTRACT

A cleaning apparatus is disclosed. The cleaning apparatus includes a roller system including a drive roller and one or more guide rollers configured to receive an elongated article to be cleaned. Each guide roller and the drive roller form a serpentine path for the article. The cleaning apparatus further includes a frame for supporting each guide roller and the drive roller; and a fluid delivery system for directing fluid at top and bottom faces of the article. The fluid delivery system includes one or more conduits. Each conduit is in fluid communication with a plurality of nozzles to direct fluid to the top and the bottom faces of the article. The cleaning apparatus further includes an actuator to linearly displace at least one of conduits back and forth during operation. The drive roller may be a sprocket for engaging and transporting the article. The article may be a conveyor belt.

8 Claims, 6 Drawing Sheets

SYSTEM AND METHOD OF CLEANING A CONVEYOR BELT

CROSS-REFERENCES TO RELATED APPLICATIONS

Not Applicable.

STATEMENT REGARDING FEDERALLY SPONSORED RESEARCH

Not Applicable.

FIELD OF THE DISCLOSURE

The present disclosure relates to an apparatus and method for cleaning an elongated flexible article such as a conveyor belt and the like, and more particularly relates to an apparatus and method for cleaning conveyor belts used in the processing of poultry and meat products.

BACKGROUND

In the manufacturing process of poultry and meat products, the use of conveyor belts to transport goods from one manufacturing process to another is a common practice. It is to be appreciated that during the transportation process, the transported goods tend to impart foreign particles (i.e. connective tissues, flesh, heavy oils, etc.) that become entrained on the conveyor belt. More specifically, foreign particles tend to accumulate in the hinge and rod area of the conveyor belt, as this area of the conveyor belt is subject to opening and closing during the transportation process. These areas are the most difficult to clean, as foreign particles tend to get pinched between the plates of the conveyor belt during processing. Over time, the entrained foreign particles begin to fester and pose sanitary risks to the process.

To avoid these sanitary concerns, periodic cleaning of the conveyor belts must be performed. Various methods have been used to clean conveyor belts in the past such as manual use of a water hose, soaking, and brushing methods. Manual cleaning is a time consuming process, and is infeasible for automated processes. In addition, manual cleaning is generally ineffective at achieving the desired quality of cleanliness. Similar to manual cleaning, allowing the conveyor belt to soak in water presents a time consuming process. Furthermore, insoluble foreign particles such as organics can require multiple soaking solutions before the belt is sanitized. Brushing methods have proven to be time effective, but present limitations in cleaning the crevices and recesses of the belt.

SUMMARY OF THE DISCLOSURE

In one aspect, the invention provides a cleaning apparatus comprising a roller system, a frame, and a fluid delivery system. The roller system includes a drive roller and one or more guide rollers configured to receive an elongated article to be cleaned. Each guide roller and the drive roller form a serpentine path for the article. The frame supports each guide roller and the drive roller. The fluid delivery system is configured to direct fluid at top and bottom faces of the article. The fluid delivery system includes one or more conduits. Each conduit is in fluid communication with a plurality of nozzles to direct fluid to the top and the bottom faces of the article. An actuator is configured to linearly displace at least one of conduits back and forth during operation. The article can be a conveyor belt. The drive roller may comprise a sprocket that engages the conveyor belt. The cleaning apparatus may further comprise a controller in electrical communication with the drive roller. The controller is configured to execute a stored program to control a speed of rotation of the drive roller. The cleaning apparatus may include a pump in fluid communication with at least one of conduits, and the controller is in electrical communication with the pump. The controller is configured to execute a stored program to control flow rate from the pump. The fluid delivery system may comprise: (i) a rinsing system, (ii) a cleaning system, and (iii) a sanitizing system, wherein the rinsing system includes a rinsing conduit in fluid communication with a plurality of rinsing nozzles to direct a rinsing fluid to the top and the bottom faces of the article, wherein the cleaning system includes a cleaning conduit in fluid communication with a plurality of cleaning nozzles to direct a cleaning fluid to the top and the bottom faces of the article, and wherein the sanitizing system includes a sanitizing conduit in fluid communication with a plurality of sanitizing nozzles to direct a sanitizing fluid to the top and the bottom faces of the article. The cleaning apparatus may further comprise a second rinsing system including a second rinsing conduit in fluid communication with a plurality of second rinsing nozzles to direct a second rinsing fluid to the top and the bottom faces of the article. The cleaning apparatus may further comprise a guide belt structured to attach to the article for guiding the article through the apparatus. The cleaning apparatus may further comprise a sensor that is configured to detect the guide belt and stop the cleaning apparatus.

In another aspect, the invention provides a cleaning apparatus comprising a roller system, a frame, and a fluid delivery system. The roller system includes a drive roller and one or more guide rollers configured to receive an elongated article to be cleaned. Each guide roller and the drive roller form a serpentine path for the article. The frame is configured for supporting each guide roller and the drive roller. The fluid delivery system is configured for directing fluid at top and bottom faces of the article. The fluid delivery system includes one or more conduits. Each conduit is in fluid communication with a plurality of nozzles to direct fluid to the top and the bottom faces of the article. The drive roller can be a sprocket for engaging and transporting the article. The article can be a conveyor belt. The cleaning apparatus may include an actuator configured to linearly displace at least one of conduits back and forth during operation. The cleaning apparatus may further comprise a controller in electrical communication with the drive roller. The controller is configured to execute a stored program to control a speed of rotation of the drive roller. The cleaning apparatus may include a pump in fluid communication with at least one of conduits. The controller is in electrical communication with the pump, and the controller can execute a stored program to control flow rate from the pump. The fluid delivery system may comprise: (i) a rinsing system, (ii) a cleaning system, and (iii) a sanitizing system, wherein the rinsing system includes a rinsing conduit in fluid communication with a plurality of rinsing nozzles to direct a rinsing fluid to the top and the bottom faces of the article, wherein the cleaning system includes a cleaning conduit in fluid communication with a plurality of cleaning nozzles to direct a cleaning fluid to the top and the bottom faces of the article, and wherein the sanitizing system includes a sanitizing conduit in fluid communication with a plurality of sanitizing nozzles to direct a sanitizing fluid to the top and the bottom faces of the article. The cleaning apparatus may further comprise a guide belt structured to attach to the article for guiding the article through the apparatus. The cleaning apparatus may further comprise a sensor configured for detecting the guide belt and stopping the cleaning apparatus.

In another aspect, the invention provides a method of cleaning a conveyor belt having hinges. The method includes the steps of: (a) feeding the conveyor belt into a cleaning apparatus; (b) spraying top and bottom faces of the conveyor belt with a fluid from nozzles; and (c) moving the nozzles during spraying the top and the bottom faces of the conveyor belt. The cleaning apparatus comprises a roller system wherein the roller system establishes a serpentine path for the conveyor belt to expose the hinges. The cleaning apparatus further comprises a fluid delivery system including one or more conduits, wherein each conduit is in fluid communication with a plurality of the nozzles. The method may further comprise attaching the conveyor belt to a first guide belt and a second guide belt prior to feeding the conveyor belt into the roller system. The method may further comprise stopping the cleaning apparatus when a sensor detects the second guide belt.

These and other features, aspects, and advantages of the present invention will become better understood upon consideration of the following detailed description, drawings, and appended claims.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
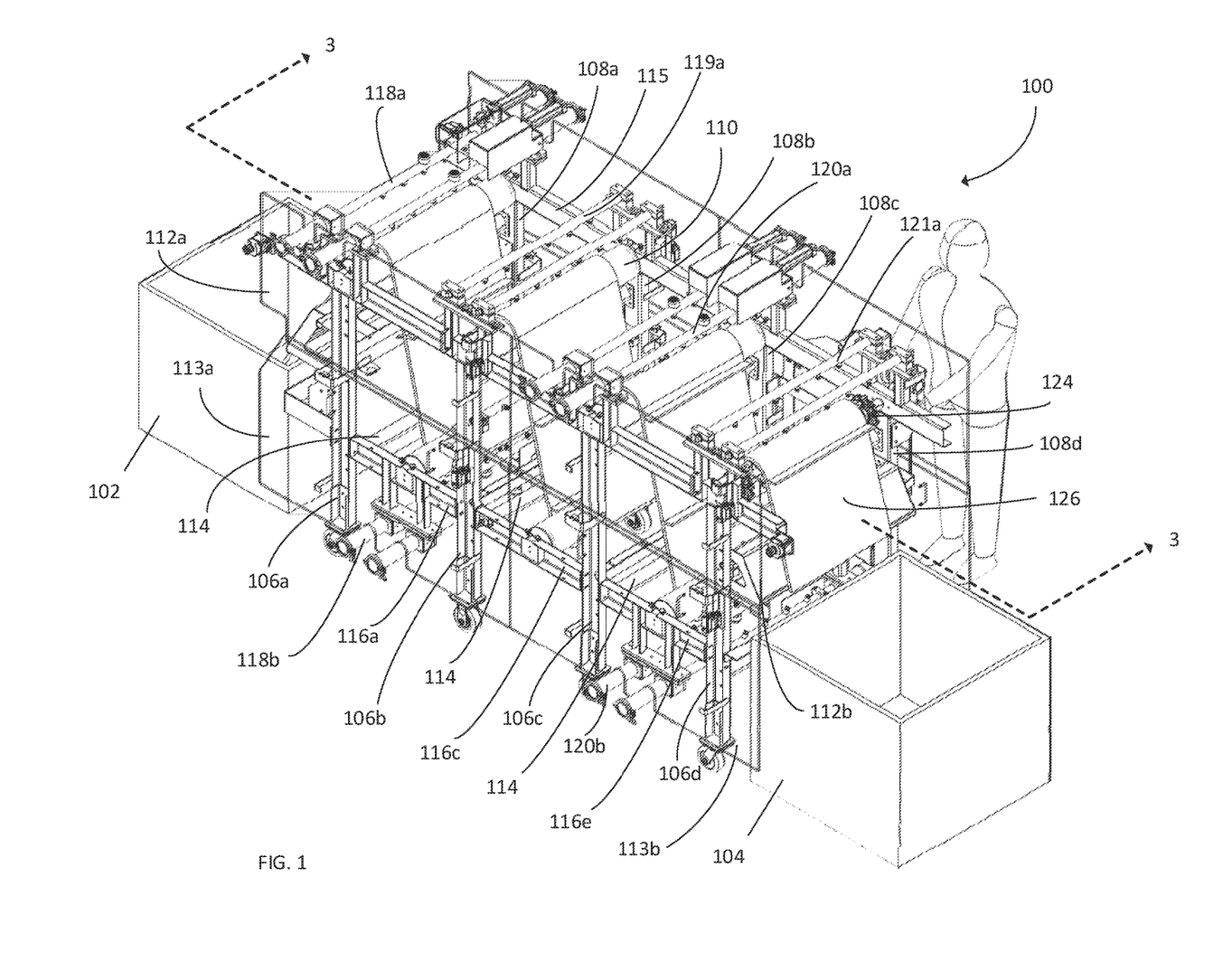
FIG. 1 is a right front perspective view of a conveyor belt cleaning and sanitizing apparatus according to one aspect of the invention.
Figure 2:
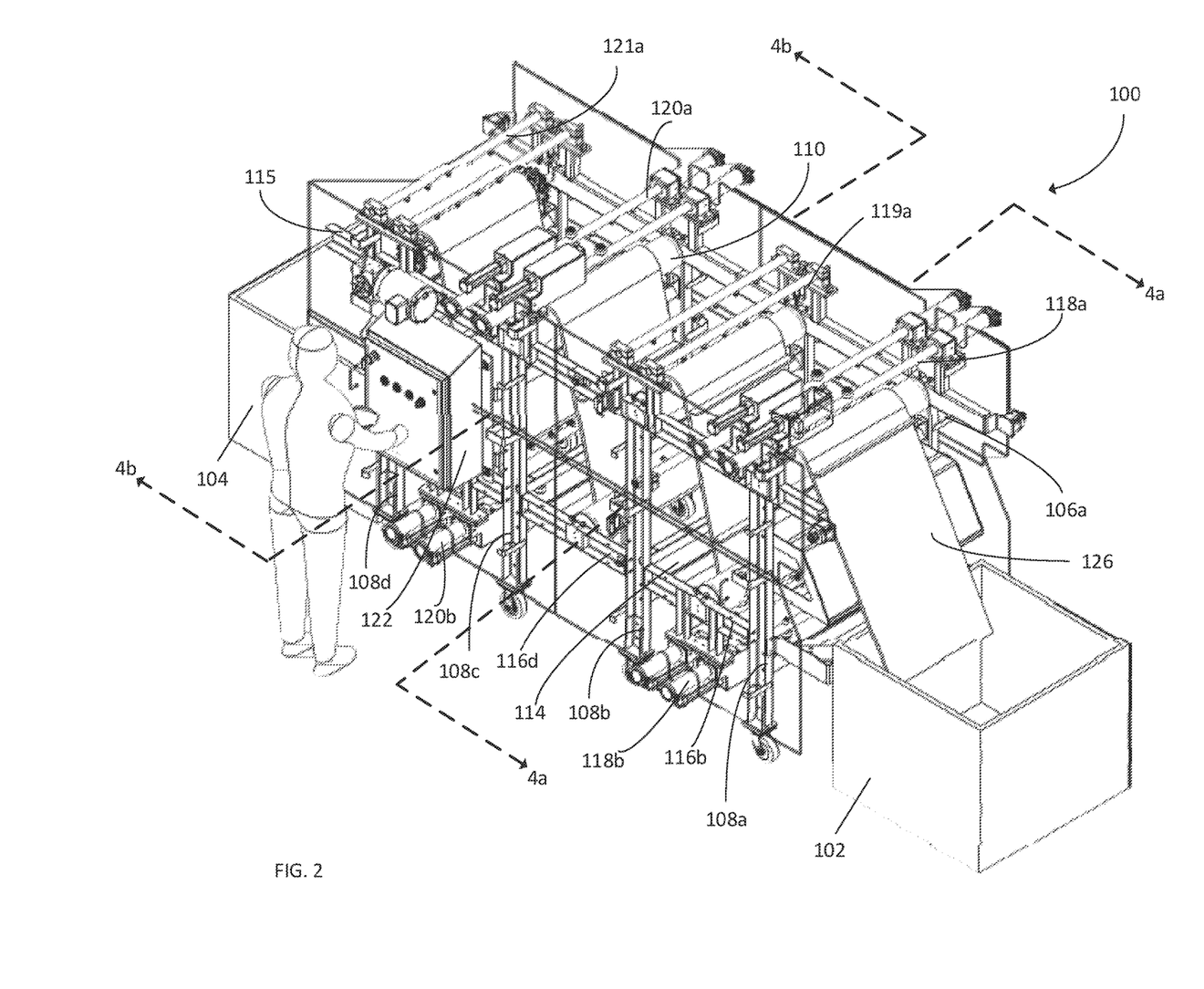
FIG. 2 is a left rear perspective view of a conveyor belt cleaning and sanitizing apparatus according to one aspect of the invention.

Referring now to the drawings wherein the reference numerals correspond to similar elements throughout the several views and, more specifically, referring to FIG. 1, the present disclosure will initially be described in the context of an exemplary conveyor belt cleaning and sanitizing apparatus 100. Referring also to FIG. 2, apparatus 100 comprises a series of structural members that defines a frame for supporting the conveyor belt cleaning and sanitizing apparatus 100. In this exemplary apparatus 100, the structural members include a plurality of first leg assemblies 106(a-d), a plurality of second leg assemblies 108(a-d), a plurality of guide rollers 110, a drive roller 124, a plurality of cover panels 112, a plurality of first cross members 114, a plurality of top lateral members 115, a plurality of bottom lateral members 116, an inlet conveyor belt guide 128, and an outlet conveyor belt guide 130. The conveyor belt cleaning and sanitizing apparatus 100 further comprises a series of cleaning and sanitizing members. In this exemplary apparatus 100, the cleaning and sanitizing members include a first rinse system 118a, a second rinse system 118b, a first cleaning system 119a, a third rinse system 120a, a fourth rinse system 120b and a first sanitizing system 121a. With momentary reference to FIGS. 4a and 4b, the system further includes a second cleaning system 119b and a second sanitizing system 121b. Apparatus 100 further includes a conveyor belt feed receptacle 102, a conveyor belt receiving receptacle 104, and a control system 122.

Figure 3:
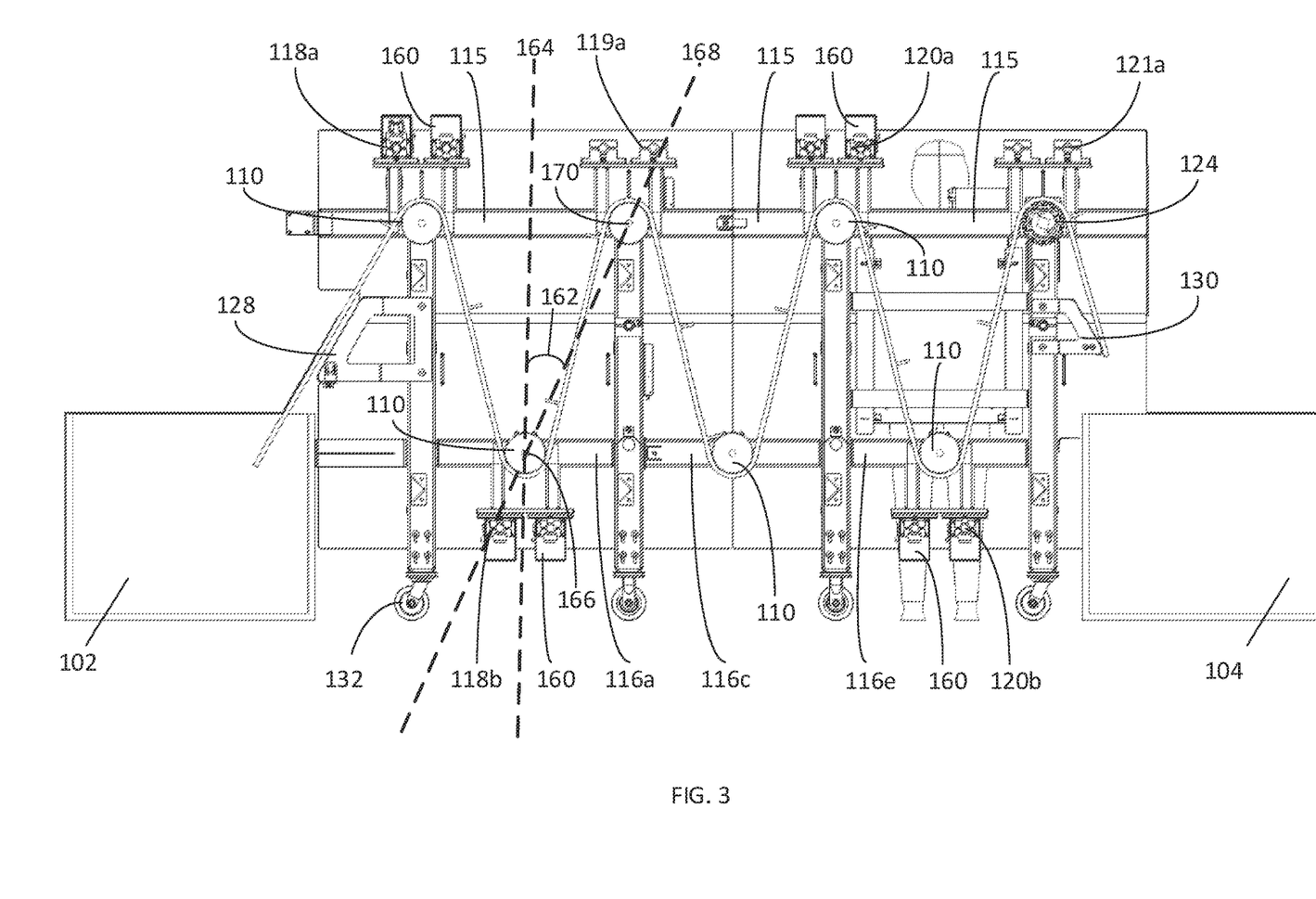
FIG. 3 is a cross sectional side view taken along lines 3-3 of FIG. 1 of a conveyor belt cleaning and sanitizing apparatus according to one aspect of the invention.

In general, a frame for the conveyor belt cleaning and sanitizing apparatus 100 includes a plurality of first leg assemblies 106(a-d) and a plurality of second leg assemblies 108(a-d). Each leg assembly 106(a-d) and 108(a-d) is similarly constructed and operates in a similar fashion and therefore, in the interest of simplifying this explanation, only leg assembly 106a will be described in detail. With reference to FIGS. 1-3, leg assembly 106a includes a top end and a bottom end wherein the bottom end can optionally further include a swivel caster 132. The swivel caster 132 includes a lockable and rotatable wheel that allows for apparatus 100 to be easily transported to multiple locations within the poultry processing facility. A width dimension for the frame in apparatus 100 is defined by the distance between the first leg assembly 106a and the second leg assembly 108a forming first and second substantially oppositely facing bearing surfaces, respectively. The oppositely facing bearing surfaces are joined by at least one first cross members 114. With reference to FIG. 3, a first length dimension for the frame is then defined by the connection of first leg assemblies 106(a-d) through a first top lateral member 115 and a bottom lateral member 116(a, c, e). Second leg assemblies 108(a-d) are similarly joined along the first length dimension.

Sill referring to FIGS. 1-3, apparatus 100 includes a plurality of top covers 112(a-b) and bottom covers 113(a-b) that are mounted to the peripheral surface of the leg assemblies 106(a-d) and 108(a-d). The peripheral surface is defined on each of the leg assemblies as the face opposite to the cross member 114. In an exemplary apparatus, a bottom cover 113a includes a rigid, rectilinear member that includes side edges that extend substantially half way along the first length dimension. The bottom cover 113a further includes oppositely facing front and rear edges, where the rear edge rests above the swivel caster 132 and the front edge extends vertically to define a first vertical height. In an exemplary apparatus, the first vertical height is substantially half the height of the leg assembly 106a. Similar to the bottom cover member 113a, the top cover member 112a includes a rigid, rectilinear member that includes side edges that extend substantially the same distance as the bottom cover member 113a along the first length dimension. The top cover member 112a further includes oppositely facing front and rear edges, where the rear edge of the top cover member 112a rests on top of the front edge of the bottom cover 113a. The front edge of the top cover 112a then extends vertically at a distance similar to the first vertical height. A top cover 112b and a bottom cover 113b are constructed in a similar fashion. The top cover 112b and the bottom cover 113b are mounted onto the leg assemblies such that the side edges of top covers 112a and 112b along are in contact with the bottom covers 113a and 113b, respectively. The plurality of top covers 112(a-b) and bottom covers(a-b) are configured to extend at least the first length dimension.

Figure 5A:
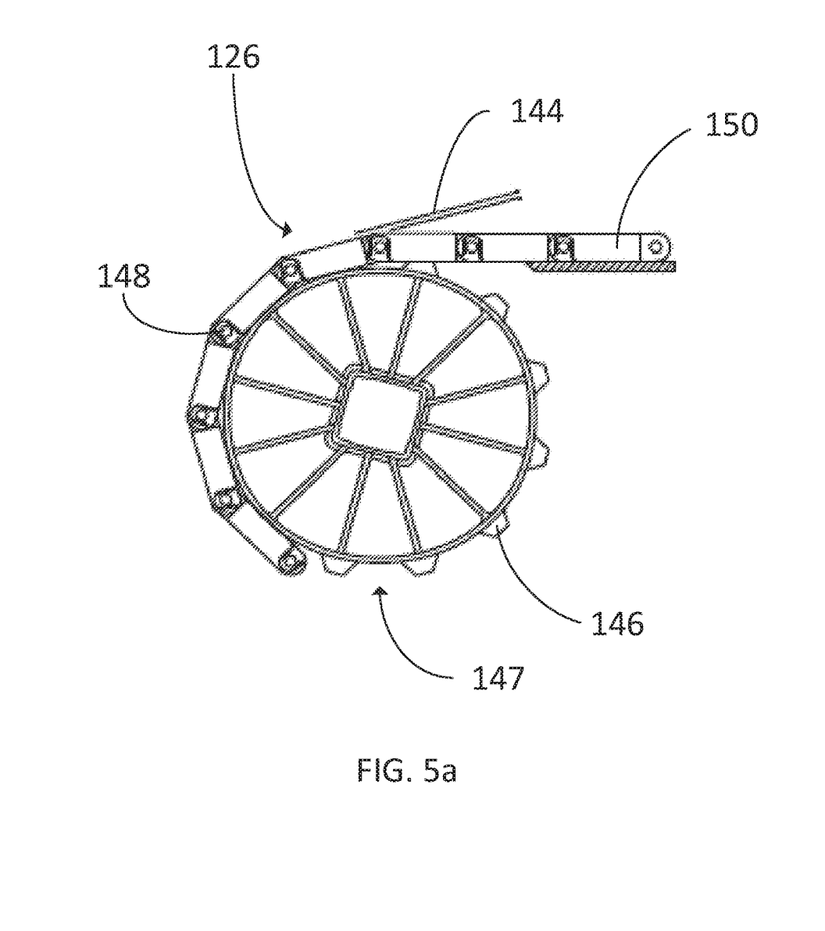
FIG. 5a is a schematic side view of a conveyor belt on a drive roller according to one aspect of the invention.
Figure 5B:
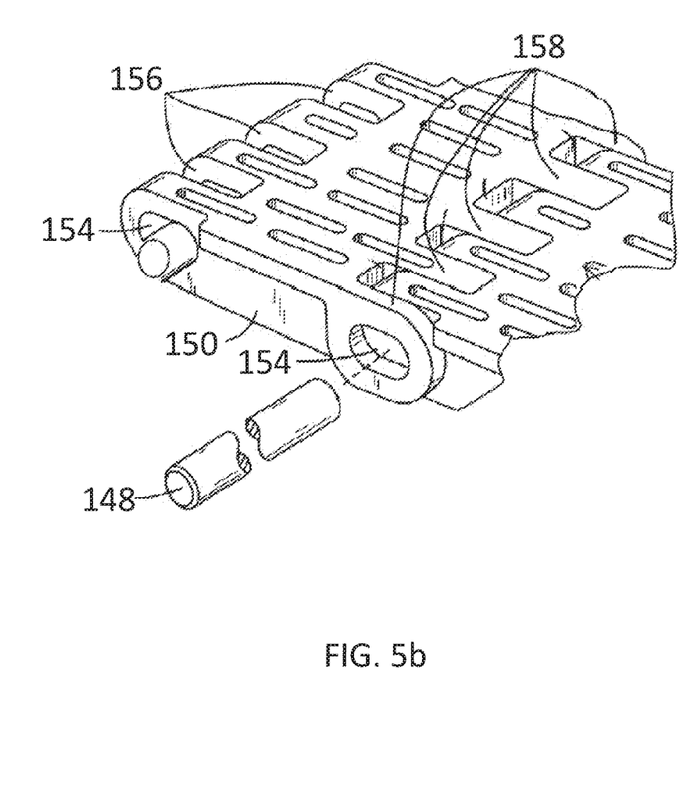
FIG. 5b is a partially exploded perspective view of a conveyor belt according to one aspect of the invention.

With reference to FIG. 3, apparatus 100 includes a plurality of guide rollers 110 that are rotatably attached between the first leg assemblies 106(a-d) and the second leg assemblies 108(a-d) along the first width dimension. The guide rollers 110 are alternatively attached to the top end of each leg assembly and the bottom lateral members 116(a-f) to establish a serpentine path for the conveyor belt 126. The serpentine path allows the cleaning and sanitizing members to contact both the top and bottom faces of the conveyor belt 126 as it moves through apparatus 100. Apparatus 100 further comprises at least one drive roller 124 that is rotatably attached between the leg assemblies along the first width dimension. The drive roller 124 is configured to be in electrical communication with the control system 122 in order to control the rotational speed of the drive roller 124. With reference to FIGS. 5a and 5b, the drive roller 124 can comprise a sprocket 147, which further comprises a plurality of teeth 146 that tangentially project from the sprocket surface. The teeth 146 of the sprocket 147 interlock with the individual chain components 150 to pull the conveyor belt 126 around the drive roller 124 and through apparatus 100. It is to be appreciated that any guide roller 110 in apparatus 100 can be replaced with a drive roller 126.

Still referencing FIGS. 5a and 5b, the conveyor belt 126 comprises a plurality of individual chain components 150 pivotally connected through a connector pin 148. The individual chain components 150 include link ends 158 that are axially spaced from each other to define a series of spaces 156. The series of spaces are adapted to receive the series of link ends 158 located on one side of the chain link 150. The link ends include openings 154 that are adapted to receive the connector pin 148 along the axial length of the individual chain components 150. It is to be appreciated that as the conveyor belt 126 travels around guide rollers 110 and the drive roller 126, the series of spaces 156 become exposed as the individual chain components pivot around the connector pin 148 due to the curvature of the guide rollers 110 and the drive roller 126. It is to be appreciated that without the rollers, the hinged area of the conveyor belt 126 would be closed thereby preventing cleaning and sanitizing fluid from efficiently cleaning entrained matter from these areas. However, apparatus 100 allows for improved cleaning and sanitizing efficiency to both the top and bottom faces of the conveyor belt 126 due to increased contact of the cleaning and sanitizing fluids to the hinge and rod area.

It is to be appreciated that multiple configurations for the guide rollers 110 and the drive roller 126 within the conveyor belt cleaning and sanitizing apparatus 100 exist. The guide rollers 110 and the drive roller 126 may be placed at any vertical height along the leg assemblies such that a serpentine path exists for the conveyor belt. The length of the top lateral member 115 and the bottom lateral member 116(a-f) can also be adjusted to change the distance between leg assemblies 106(a-d) and 108(a-d). With reference to FIG. 3, the vertical and horizontal position of the guide rollers 110 within the frame can be varied to change an included angle 162 that exists between the top and bottom guide rollers 110. The included angle 162 can be defined by a first vertical reference plane 164 that exists along the vertical axis of a first axis of rotation 166 and a second reference plane 168 that exists between the first axis of rotation 166 and a second axis of rotation 170. In some aspects, the included angle 162 varies between 10° and 70°. In other aspects, the included angle 162 varies between 30° and 50°. For certain conveyor belt 126 configurations, the included angle 162 is related to the amount of exposed hinge and rod area around the guide rollers 110. For example, at higher included angles 162, such as 70° to 90°, the amount of exposed hinge and rod area around the guide rollers 110 is substantially less than at lower included angles 162, such as 10° to 30°. The width of the guide rollers 110 is also related to the amount of exposed hinge and rod area. In some aspects, the width of the guide rollers 110 is between 2 to 12 inches. In other aspects, the width of the guide rollers 110 is between 4 to 8 inches.

Still referring to FIGS. 1-3, apparatus 100 further comprises fluid dispensing members used to rinse, clean, and sanitize the conveyor belt 126. A first rinse system 118a is mounted to the top end of the first leg assembly 106a and the second leg assembly 108a through a first support member 107 defining a second vertical height above the frame. The first rinse system 118a further including at least one conduit extending the width dimension between the first leg assembly 106a and the second leg assembly 108a. The first rinsing system 118a is in fluid communication with a rinsing fluid source, and is also in electrical communication with the control system 122. The control system 122 is used to regulate the pressure and flow rate of rinsing fluid through the at least one conduit. The at least one conduit in the first rinse system 118a includes a plurality of nozzles for directing the rinsing fluid to the guide roller 110. In one aspect, the nozzles have an included angle between 10° and 30° relative to the vertical plane defined by the axis of rotation of the guide roller 110. The plurality of nozzles in the first rinse system 118a direct rinsing fluid toward the top face of the conveyor belt 126. The first rinse system 118a further includes an actuator or slide unit 160 configured parallel to the at least one conduit that is used to displace the conduit forward and backward in a linear movement. The actuator or slide unit 160 is in electrical communication with the control system 122 to regulate the stroke speed of the first rinse system 118*a*. In one aspect, the stroke speed of the first rinse system 118*a* is between 10 to 100 strokes/minute. In another aspect, the stroke speed of the first rinse system is between 50 to 70 strokes/minute. The translation of the first rinsing system 118*a* improves cleaning efficiency by increasing rinsing fluid contact with hard to reach locations such as the hinge and rod area.

Still referring to FIGS. 1-3, apparatus 100 also comprises a second rinsing system 118*b*. Unlike the first rinse system 118*a*, the second rinse system 118*b* is mounted to the bottom end of the bottom lateral members 116*a* and 116*b* through a second support member 109 defining a third vertical height below the frame. At least one conduit extends the width dimension between the two bottom lateral members 116*a* and 116*b*. The second rinse system 118*b* contains substantially all of features of the first rinse system 118*a* that are described above, with the exception of directing the rinsing fluid toward the bottom face of the conveyor belt 126. The apparatus 100 may include a guide between the guide roller 110 and the second rinse system 118*b* to guide the conveyor belt 126 to prevent the conveyor belt 126 from hitting the second rinse system 118*b*.

Referring to FIG. 3, apparatus 100 further comprises a first cleaning system 119*a* and a first sanitizing system 121*a*. The first cleaning system 119*a* and the first sanitizing system 121*a* are mounted to the frame in substantially the same manner as the first rinsing system 118*a* with the exception of being connected to different leg assemblies. In particular, the first cleaning system 119*a* is attached between the first leg assembly 106*b* and the second leg assembly 108*b* along the width dimension. Similarly, the first sanitizing system 121*a* is attached between leg the first leg assembly 106*d* and the second leg assembly 108*d*. The first cleaning system 119*a* and the first sanitizing system 121*a* similarly include at least one conduit extending the width dimension and a plurality of nozzles. In one aspect, the nozzles have an included angle between 10° and 30° relative to the vertical plane defined by the axis of rotation of the guide roller 110. In another aspect, the nozzles can be directed perpendicular to the top lateral member 115. The first cleaning system 119*a* and the first sanitizing system 121*a* are in fluid communication with a cleaning fluid source and a sanitizing fluid source, respectively. The first cleaning system 119*a* and the first sanitizing system 121*a* are further in electrical communication with the controller 122 to regulate the pressure and flow rate through the respective conduits.

Still referring to FIG. 3, apparatus 100 further comprises a third rinsing system 120*a* and a fourth rinsing system 120*b*. The third rinsing system 120*a* and the fourth rinsing system 120*b* are similarly constructed and operate in a similar fashion to the first rinsing system 118*a* and the second rinsing system 118*b*, respectively. However, the third rinsing system 120*a* is connected between the first leg assembly 106*c* and the second leg assembly 108*c* along the width dimension. The fourth rinsing system 120*b* is attached between bottom lateral members 116*e* and 116*f* along the width dimension of the frame. The apparatus 100 may include a guide between the guide roller 110 and the fourth rinsing system 120*b* to guide the conveyor belt 126 to prevent the conveyor belt 126 from hitting the fourth rinsing system 120*b*.

Figure 4A:
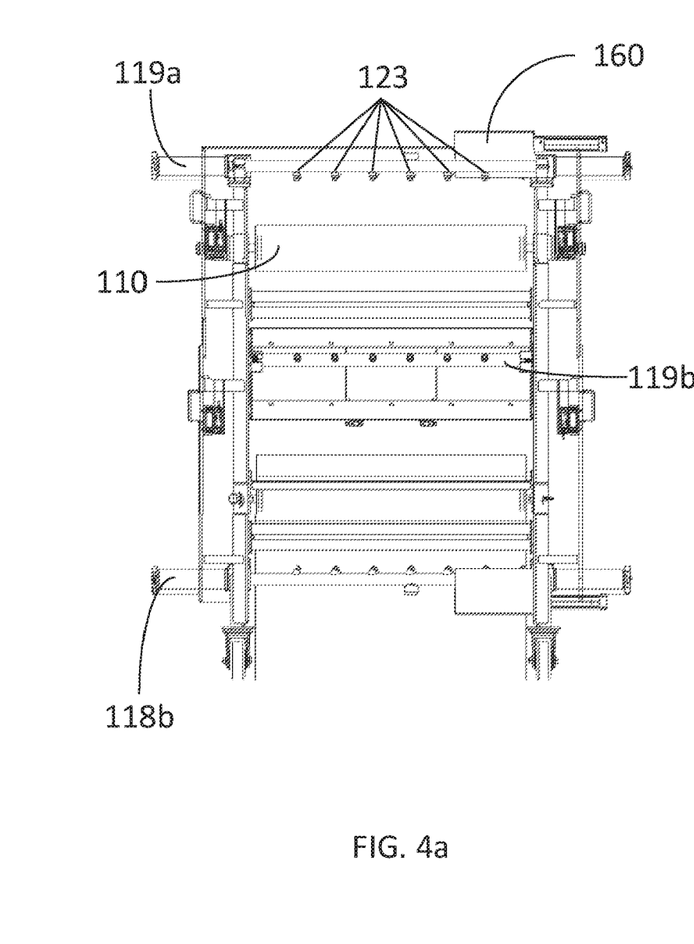
FIG. 4a is a cross sectional side view taken along lines 4a-4a of FIG. 2 of a conveyor belt cleaning and sanitizing apparatus according to one aspect of the invention.
Figure 4B:
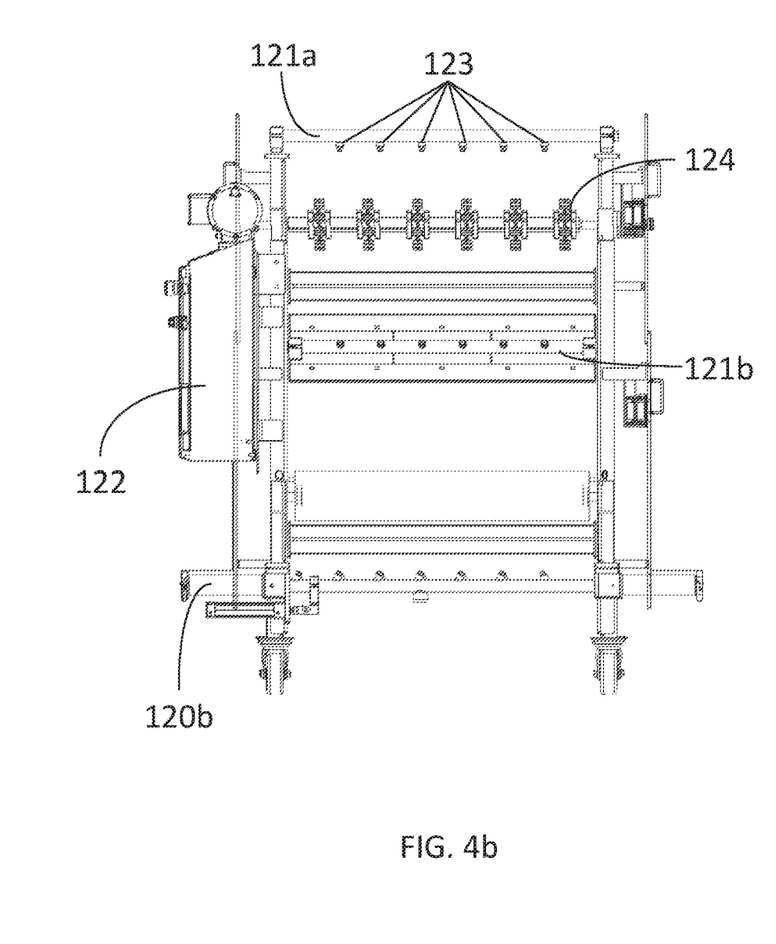
FIG. 4b is a cross sectional side view taken along lines 4b-4b of FIG. 2 of a conveyor belt cleaning and sanitizing apparatus according to one aspect of the invention.

With reference to FIGS. 4*a* and 4*b*, apparatus 100 further comprises a second cleaning system 119*b* and a second sanitizing system 121*b*. The second cleaning system 119*b* includes a conduit that is mounted to the first leg assembly 106*b* and the second leg assembly 108*b* along the width dimension of the frame. In apparatus 100, the second cleaning system 119*b* is positioned on the first leg assembly 106*b* and the second leg assembly 108*b* such that it is mounted at substantially half the height of the respective leg assemblies. It is to be appreciated that the second cleaning system 119*b* can be located at any vertical height along the leg assemblies. The second cleaning system 119*b* further includes a plurality of nozzles configured to spray perpendicular to the leg assemblies. The second sanitizing member 121*b* is similarly constructed and operates in a similar fashion to the second cleaning system 119*b*. However, the second sanitizing member 121*b* is mounted to the first leg assembly 106*d* and the second leg assembly 108*d* along the width dimension of the frame. The second cleaning system 119*b* and the second sanitizing system 121*b* are in fluid communication with a cleaning fluid source and a sanitizing fluid source, respectively. The second cleaning system 119*b* and the second sanitizing system 121*b* are further in electrical communication with the controller 122 to regulate the pressure and flow rate through the respective conduits.

It is to be appreciated that multiple configurations of the cleaning and sanitizing apparatus 100 exist. Although not illustrated, extra leg assemblies could be added to the frame of the cleaning and sanitizing apparatus 100 as described above such that there are more rinsing, cleaning, and sanitizing members (e.g. five, eight, twenty, etc.).

Figure 6:
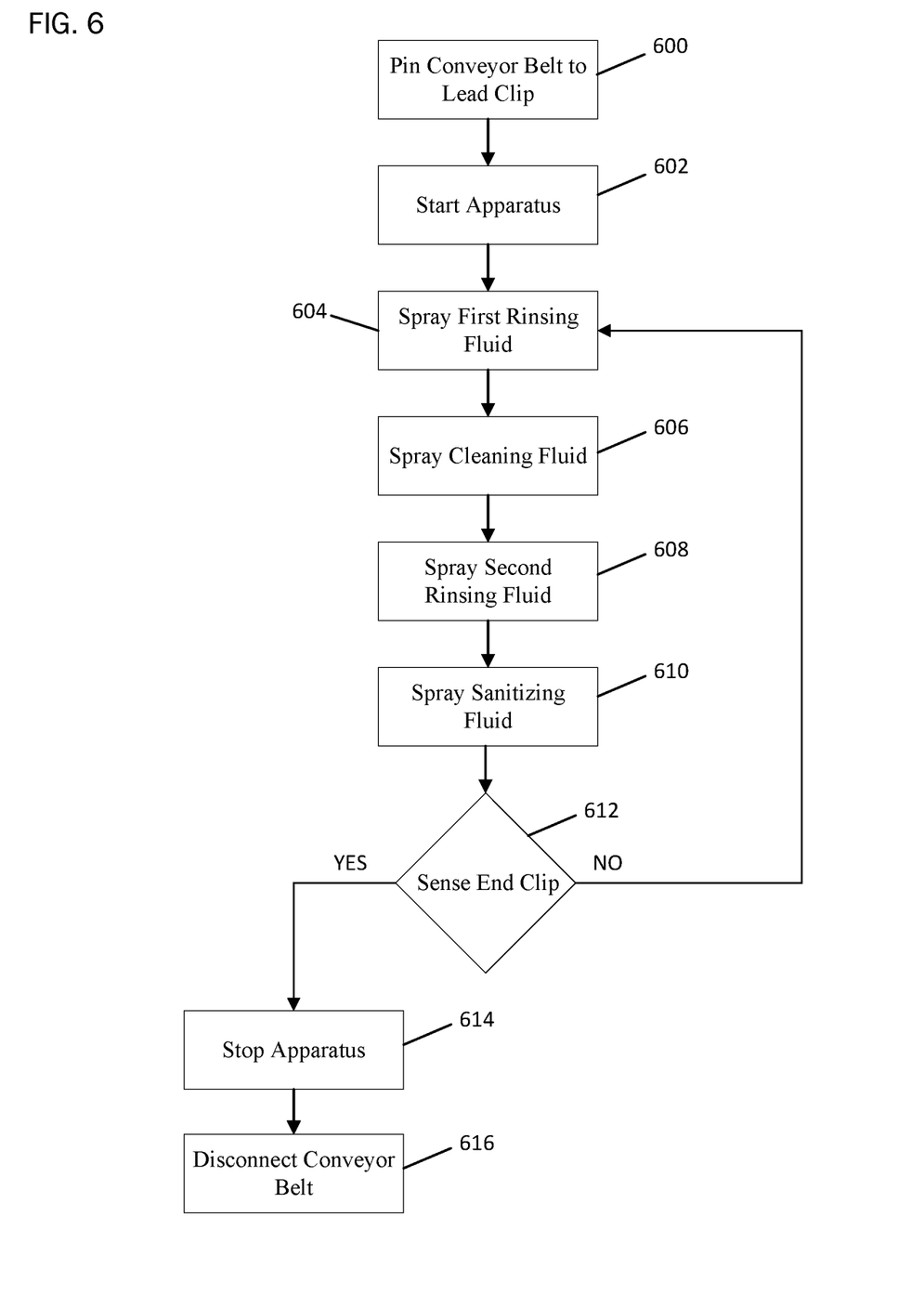
FIG. 6 is a flow chart setting forth the steps for washing and sanitizing a conveyor belt according to one aspect of the invention.

Operation of the conveyor belt cleaning and sanitizing apparatus 100 will be described with reference to FIG. 6. Prior to operation, the conveyor belt 126 is connected using a lead clip to a first leading guide belt at the front of the conveyor belt, and the conveyor belt 126 is connected using an end clip to a second trailing guide belt at the end of the conveyor belt 600. The conveyor belt 126 is connected to the first guide belt by connecting the link ends 158 of the conveyor belt into the series of spaces 156 of the first guide belt. Next, a connector pin 148 is advanced through the openings 154 that are adapted to receive the connector pin along the axial length of the individual chain components 150. The same procedure is used to connect the conveyor belt 126 to the second guide belt. Still prior to operation, the first guide belt is positioned in the serpentine path around the plurality of guide rollers 110 and the drive roller 124, as shown in apparatus 100. The second guide belt is positioned in the feed receptacle 102 along with the conveyor belt 126. The apparatus can then be started 602 using the control system 122, which is used to regulate the rotational speed of the drive roller 126. In one aspect, the conveyor belt moves through the cleaning and sanitizing apparatus 100 at 30 to 80 ft./min. An ultrasonic sensor is positioned at the feeding and receiving end of the cleaning and sanitizing apparatus. The ultrasonic sensor is used as a safety device, and the cleaning and sanitizing apparatus will not start unless a first guide belt and conveyor belt 126 are detected. In non-limiting example forms, the conveyor belt 126 may be 6 to 36 inches wide and about 100 feet long.

During operation, the conveyor belt 126 is first rinsed 604 using a rinsing fluid from the first rinsing system 118*a* and the second rinsing system 118*b*. In one aspect, the rinsing fluid comprises tap water or deionized water, and the temperature of the rinsing fluid is between 140° F. and 180° F. In some aspects, the pressure of the rinsing fluid is between 150 and 1000 psi. The conveyor belt is then cleaned 606 using a cleaning fluid from the first cleaning system 119*a* and the second cleaning system 119*b*. In one aspect, the cleaning fluid comprises a chlorinated alkaline foam cleaner. The cleaning fluid helps to dissolve the organic foreign matter (fats, lipids, turkey skin, etc.). The temperature of the cleaning fluid can be between 140° F. and 180° F., and the pressure of the cleaning fluid can be between 150 and 1000 psi. The conveyor belt 126 is then rinsed 608 for a second time using a rinsing fluid from the third rinsing system 120*a* and the fourth rinsing system 120*b*. The conveyor belt is then sanitized 610 using a sanitizing fluid from the first sanitizing system 121*a* and the second sanitizing system 121*b*. In one aspect, the sanitizing fluid comprises at least one of sodium hypochlorite, acidic sanitizers (e.g., phosphoric acid, peroxyacetic acid), and quaternary ammonium compounds. Next, the rinsing, cleaning, and sanitizing members will continue to operate 612 until the ultrasonic sensor detects the second guide belt. Once the second guide belt is detected 614, the apparatus will automatically shut down. The conveyor belt 126 can then be disconnected 616 and returned to the poultry processing facility.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

What is claimed is:

1. A cleaning apparatus comprising:
 a roller system including a drive roller and at least a first guide roller and a second guide roller configured to receive an elongated article to be cleaned, the first guide roller, the second guide roller, and the drive roller forming a serpentine path for the article;
 a frame for supporting the first guide roller, the second guide roller, and the drive roller,
 wherein the first guide roller is rotatably attached between a first leg assembly and a second leg assembly, the drive roller is rotatably attached between a third leg assembly and a fourth leg assembly, and the second guide roller is rotatably attached between a first lateral member and a second lateral member,
 wherein the first lateral member is coupled between the first leg assembly and the third leg assembly and the second lateral member is coupled between the second leg assembly and the fourth leg assembly;
 a fluid delivery system for directing fluid at top and bottom faces of the article, the fluid delivery system including one or more conduits, each conduit being in fluid communication with a plurality of nozzles to direct fluid to the top and the bottom faces of the article,
 wherein the drive roller is a sprocket for engaging and transporting the article.

2. The cleaning apparatus of claim 1 wherein:
 the article is a conveyor belt.

3. The cleaning apparatus of claim 1 wherein:
 an actuator to linearly displace at least one of the conduits back and forth during operation.

4. The cleaning apparatus of claim 1 further comprising:
 a controller in electrical communication with the drive roller, the controller executing a stored program to control a speed of rotation of the drive roller.

5. The cleaning apparatus of claim 4 wherein:
 the cleaning apparatus includes a pump in fluid communication with at least one of conduits,
 the controller being in electrical communication with the pump, the controller executing a stored program to control flow rate from the pump.

6. The cleaning apparatus of claim 1 wherein:
 the fluid delivery system comprises: (i) a rinsing system, (ii) a cleaning system, and (iii) a sanitizing system,
 the rinsing system including a rinsing conduit in fluid communication with a plurality of rinsing nozzles to direct a rinsing fluid to the top and the bottom faces of the article,
 the cleaning system including a cleaning conduit in fluid communication with a plurality of cleaning nozzles to direct a cleaning fluid to the top and the bottom faces of the article, and
 the sanitizing system including a sanitizing conduit in fluid communication with a plurality of sanitizing nozzles to direct a sanitizing fluid to the top and the bottom faces of the article.

7. The cleaning apparatus of claim 1 further comprising:
 a guide belt structured to attach to the article for guiding the article through the apparatus.

8. The cleaning apparatus of claim 1 further comprising:
 a sensor for detecting a guide belt structured to attach to the article for guiding the article through the apparatus and stopping the cleaning apparatus.

\* \* \* \* \*